No. 46,720.
J. J. SQUIRE.
FRUIT CAN.
PATENTED MAR. 7, 1865.
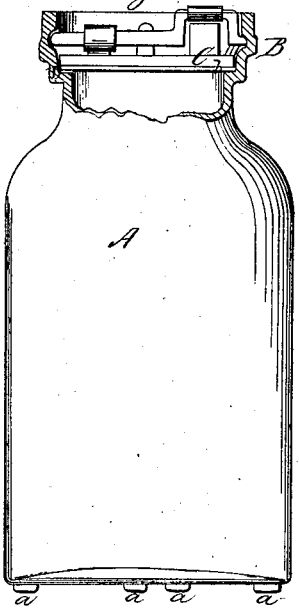
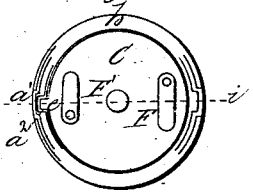
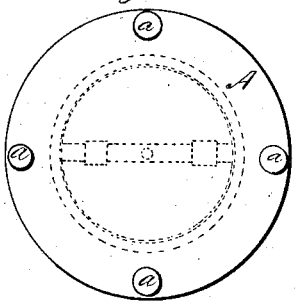
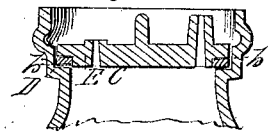
Witnesses.
Theo Lusch
Wm Freurn
Inventor.
John J Squire
Jnr Munn &Co
Attorneys

UNITED STATES PATENT OFFICE.

JOHN J. SQUIRE, OF WINDSOR LOCKS, CONNECTICUT.

IMPROVEMENT IN FRUIT-JARS.

Specification forming part of Letters Patent No. 46,720, dated March 7, 1865.

*To all whom it may concern:*

Be it known that I, JOHN J. SQUIRE, of Windsor Locks, in the county of Hartford and State of Connecticut, have invented a new and useful Improvement in Preserve and Fruit Jars of Glass or Equivalent Materials; and I do hereby declare that the following is a full, clear, and exact description thereof, which will enable those skilled in the art to make and use the same, reference being had to the accompanying drawings, forming part of this specification, in which—

Figure 1 is an elevation of a jar constructed after my invention, hereinafter described. Fig. 2 is a view of the bottom. Fig. 3 is a view of its cover. Fig. 4 is a vertical section of the top of the jar.

Similar letters of reference indicate corresponding parts.

This improvement embraces two particulars—one being the providing the bottom of jars in which fruits, meats, or other substances are to be preserved with pedestals or feet, and the other consisting in a novel device for securing the cover.

A represents a fruit-jar constructed after my improvements.

In putting up fruits and other substances for preservation, the jar is placed in a vessel containing hot water, the temperature of which is carried to a suitable height, so as to heat its contents and expand them, and also to drive off a portion of the liquid contained therein in the form of steam or vapor, so that afterward, when the jar is covered and its contents allowed to cool, a partial vacuum will be made therein both by the contraction of said contents and by reason of the loss of a portion of its liquids.

When jars with smooth or flat bottoms are used their bottom surfaces are everywhere in contact with the bottom surface of the boiler in which they are placed to be heated, as above explained, and consequently any circulation of the hot water over the bottom of the jar is prevented, and glass jars are liable to be broken from this cause. The same remark is true of those jars whose bottoms are concave in the center and yet their outer portions or edges are in the same horizontal plane. In order to secure an active circulation of the water or other heating medium under the bottom, like that which takes place about its sides, I have formed pedestals or feed $a$ on its under surface, as seen in the drawings, where they are shown four in number, and placed on the outer circumference of the bottom of the bottle at points equally distant from each other, so that it will stand firm. Instead of being in the form of circular pedestals, they may be made square or elongated.

The next feature of my improvement is in the means used for making a tight joint in the neck of the jar. A square shoulder or rabbet, D, is formed on the inner circumference of its neck at that point, which is to receive the edge of the cover C. The lower edge of the cover has a rabbet (lettered B) formed on it, converse in form, and fitting to the rabbet or shoulder D in the neck of the jar. An elastic packing-ring, $b$, is placed in the rabbet B of the cover, which, when the cover is in place, rests upon the base of the shoulder D. The width of the ring and of the rabbets D and B are to be such that the ring will be inclosed by the sides of said rabbets, so that it shall not come in contact with the contents of the jar.

E represents a transverse locking-bar, turning upon a central pivot, $e$, and bearing upon inclined surfaces F F', which, being perforated and of unequal height, may be used for the introduction of liquor after the jar is closed, air escaping through the aperture $f$, while liquor enters through the aperture $f'$. The ends of the bar pass down through vertical grooves $a'$ $a'$, and engage in a circular groove, $a$, within the neck, when the turning of the bar compresses the cover down upon its seat by the wedge-like action of the inclined projections F F'.

$c$ represents a projection upon the cover C, which, by engaging in a recess, $a^2$, formed in the neck of the jar within the rabbet D, keeps the cover from turning with the bar E.

I claim as new and desire to secure by Letters Patent—

1. In jars for preserving fruits, meats, and other substances, forming pedestals on the bottom thereof, so as to obtain a free circulation of the heating medium beneath them when they are placed in such medium in the process of putting them up for market, substantially as described.

2. The cover C, formed with projections $c$ F F', in the described combination with the packing-ring $b$ and locking-bar E, for the purposes set forth.

JOHN J. SQUIRE.

Witnesses:
CHAS. W. DENSLOW,
EDMUND HILLS